Figure 1:
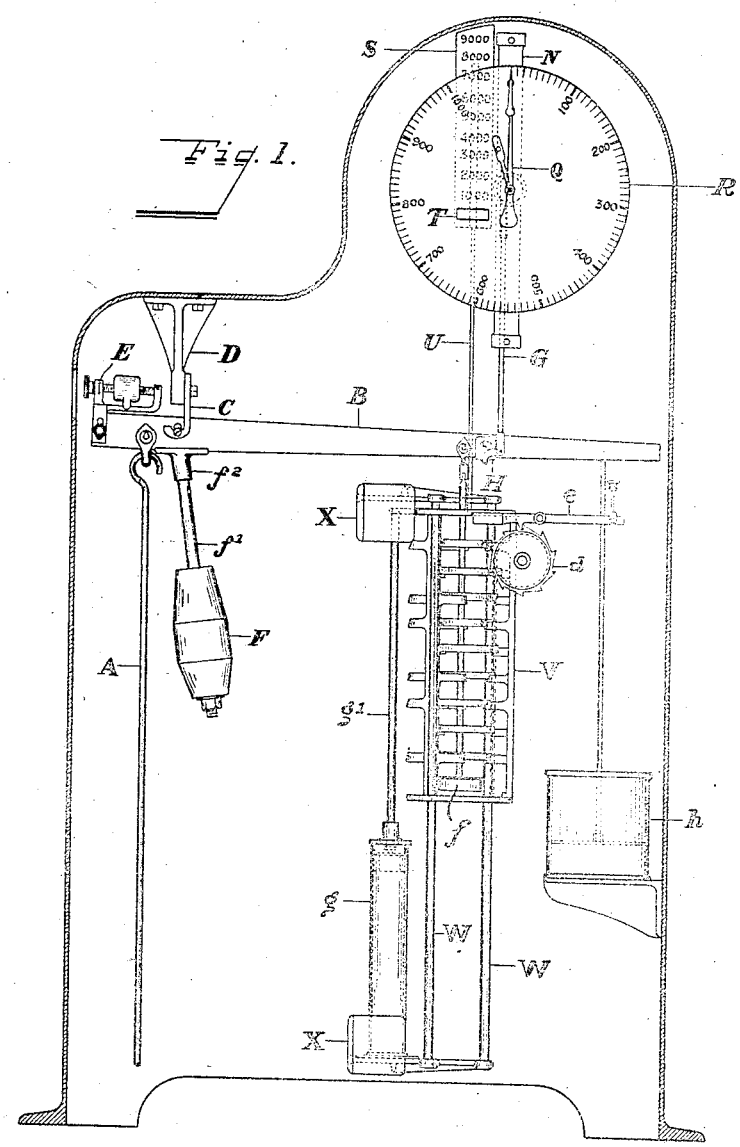

L. A. OSGOOD.
AUTOMATIC WEIGHING SCALE.
APPLICATION FILED SEPT. 30, 1912.

1,159,412.

Patented Nov. 9, 1915.
3 SHEETS—SHEET 1.

Witnesses

Inventor
Louis A. Osgood.
By
Attorneys

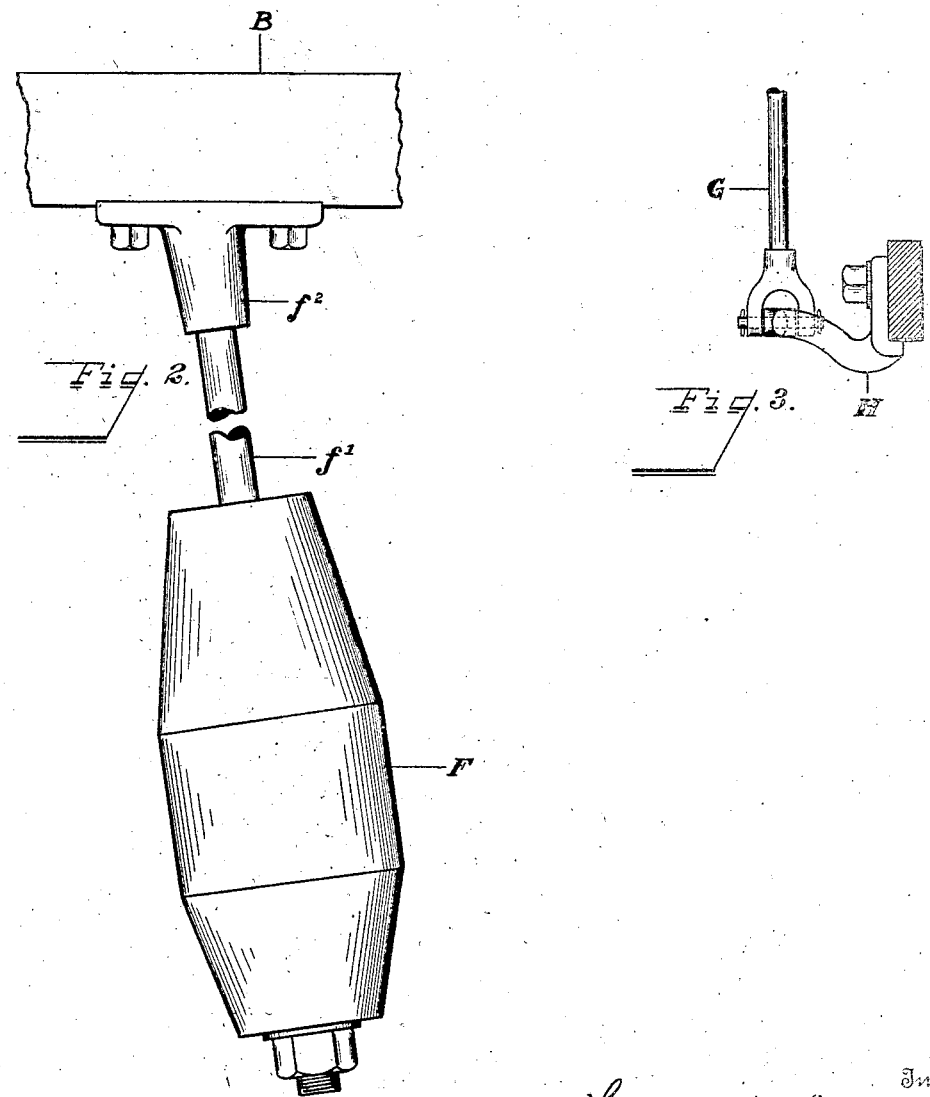

L. A. OSGOOD.
AUTOMATIC WEIGHING SCALE.
APPLICATION FILED SEPT. 30, 1912.
1,159,412.
Patented Nov. 9, 1915.
3 SHEETS—SHEET 3.
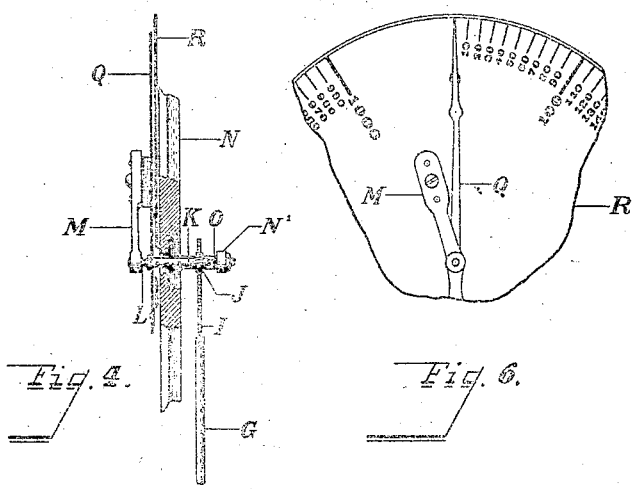
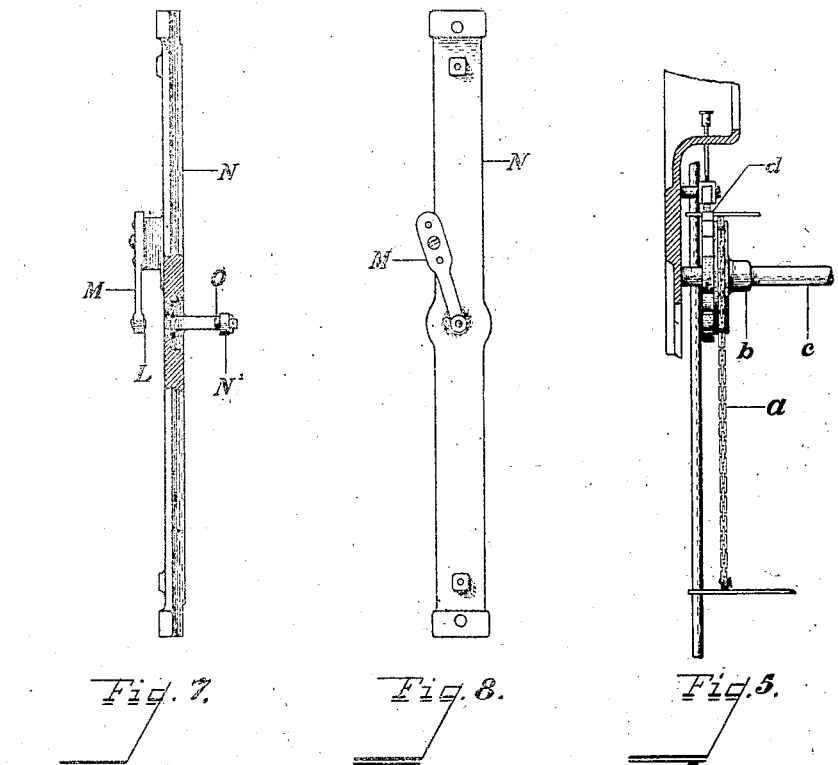

UNITED STATES PATENT OFFICE.

LOUIS A. OSGOOD, OF SPRINGFIELD, OHIO, ASSIGNOR TO THE WINTERS-COLEMAN SCALE COMPANY, OF SPRINGFIELD, OHIO, A CORPORATION OF OHIO.

AUTOMATIC WEIGHING-SCALE.

1,159,412. Specification of Letters Patent. Patented Nov. 9, 1915.

Application filed September 30, 1912. Serial No. 723,180.

*To all whom it may concern:*

Be it known that I, LOUIS A. OSGOOD, a citizen of the United States, residing at Springfield, in the county of Clark and State of Ohio, have invented certain new and useful Improvements in Automatic Weighing-Scales, of which the following is a specification.

This invention relates to improvements in weighing machines, and particularly in making the mechanism compact, simple in its construction and efficient for its purpose.

Referring to the drawings, Figure 1 is a front elevation of the machine; Figs. 2 and 3 are detail views of parts of the machine; Figs. 4 and 5 are sectional views of the pinion shaft and its bearings, and the cage supporting shaft; Figs. 6, 7 and 8 are details of parts of the indicator and its supporting mechanism.

Like letters of reference indicate like parts throughout the different views.

The improvements relate more particularly to the type of machine known as the dial-pendulum scale, and there is illustrated herein a pendulum scale, employing an elongated load supporting member, having the pendulum rigidly attached to that member and connections between the load supporting member and an indicator hand whereby the load will be indicated on a dial by the hand, but this is not to be understood as limiting the invention to the precise details.

There is preferably employed a connecting rod "A" through which the weight of the load is transmitted in any usual way. This rod is attached in the usual way at its upper end to the beam "B" (see Fig. 1), which is fulcrumed on the plate "C," fastened to the bracket "D" which in turn is secured to the case of the machine. The bracket "B" is secured to one end of the beam and the balance ball adjustably mounted therein.

The counterpoise pendulum "F" is screw threaded and adjustably mounted on rod "f" securely attached in bracket "f²," which is secured in turn to beam "B," and as illustrated in Fig. 1, the pendulum is preferably secured to that elongated load supporting element "B" near the fulcrum point and is mounted at an inclination to the vertical, but an important feature of this improvement is in employing an elongated load supporting element to which the pendulum is directly secured, the supporting element being capable of being directly connected to the indicator hand at its opposite end.

Referring to the connections to the indicator hand, there is employed a rack rod "G" (Figs. 1 and 4) connected to beam "B" by the arm "H" (see Figs. 3 and 1) in the usual and approved manner. This rack rod "G" has the rack "L" at its upper end, engaging pinion "J" on the pinion shaft "K."

This shaft "K" is pivotally mounted in bearings at the ends, the outer end having its bearing in cup bearing "L" (Fig. 7) which bearing is seated in the plate "M" which is secured to bracket or rib "N," projecting from the stationary casing of the machine, and the inner end of the shaft "K" is supported in the cup bearing "O," seated in bracket "N'," which is preferably formed integral with rib "N" (Figs. 7 and 4.)

"Q" is the indicator hand secured to the pinion shaft "K" and same coöperates with the dial "R."

As clearly appears from Fig. 1, the dial "R" has indicating numbers extending partially around its face, leaving an unmarked space on the margin, and by reason of the construction here employed, it is not necessary that the indicator hand make a complete revolution. Consequently the plate "M" is preferably located in the unmarked space where its connections to bracket "N" will not interfere with the proper movement of the indicator hand.

It therefore appears that there is here disclosed an indicator shaft supported by outer and inner cup shaped bearings without in any way interfering with the proper movement of the indicator hand.

An indicating plate "S" (Fig. 1) coöperates with an opening "T" to indicate integer amounts of the load on the scale. This plate "S" is adjustably connected to the cage "V," which cage contains a number of counterpoises. The cage "B" is connected at its bottom to a chain "a" (Fig. 5) which extends upwardly and is connected at its upper end to a pinion or sheave "b"; the sheave being secured to the shaft "c," and in close proximity to the sheave "b." There is shown a ratchet wheel "d" also secured to the shaft "c," and the ratchet pawl "e" is pivotally mounted on the frame so that the end of the pawl normally engages the teeth of the ratchet "d" and the outer end of the pawl "e" is formed with a key so that by depressing the key the ratchet "d" will be released, and the cage "V" will be allowed to drop and thereby transfer the poises from the cage to the pendant, as illustrated and explained in the co-pending application of H. B. Osgood, Serial No. 683157. There are also preferably employed dash pot "h" connected to the beam, and the retarding cylinder "g" connected to the cage, so as to cushion the movements of those parts.

W W are guide rods for the movable cage V, and X is a support for the retarding cylinder g and the guide rods W W.

Having thus described my invention, I claim:—

1. In a weighing machine, the combination of an automatic pendulum, dial scale with a supplemental weighing scale normally disconnected from the first mentioned scale, consisting of a movable support normally held in its extreme upper position, but adapted to move downwardly, a plurality of counterbalancing weights on said support, removably held thereon, and manually operated means for arresting the said support and holding same against further movement, whereby the proper counterbalance will be shifted from said support to said first mentioned scale.

2. In a weighing machine, the combination of an automatic pendulum, dial scale with a supplemental weighing scale normally disconnected from the first mentioned scale, consisting of a movable support and a plurality of counterbalances on said support adapted to be deposited successively on the first mentioned scale, and manually operated means arranged to arrest said support at a plurality of points during its movements whereby one or more of said counterbalances will be shifted to the first mentioned scale and means for restoring said support to normal disconnected position.

3. In a weighing machine, the combination of an automatic pendulum, dial scale with a supplemental weighing scale normally disconnected from the first mentioned scale, consisting of a movable support and a plurality of counterbalances on said support, the counterbalances arranged in series, one separated from the other, and manually operated holding devices for said support coöperating therewith to permit the operator to apply one by one the counterbalances until the required amount has been applied to the first mentioned scale and indicating devices for indicating the amounts of counterbalance applied for the purpose specified.

4. In a weighing scale, the combination of a load supporting element, a main counterbalance for said element, a supplemental counterbalancing-device comprising a gravity-operated cage and a plurality of poises normally supported thereon, a ratchet and pawl device located in proximity to the cage, and a flexible chain for connecting the cage to the ratchet whereby upon the release of the pawl the ratchet will be operated by the downward movement of the cage to transmit the poises onto the load supporting element, for the purpose specified.

In testimony whereof, I have hereunto set my hand this 21st day of September 1912.

LOUIS A. OSGOOD.

Witnesses:
CHAS. I. WELCH,
OLIVER T. CLARKE.